July 2, 1940.  E. SKLAR  2,206,371
AUTOMATIC SAFETY CONTROL AND CHANGE-OVER
Original Filed Jan. 17, 1931  5 Sheets-Sheet 3

FIG-5

Inventor
Ezra Sklar
by A. D. Caesar
Attorney

Patented July 2, 1940

2,206,371

UNITED STATES PATENT OFFICE 2,206,371

AUTOMATIC SAFETY CONTROL AND CHANGE-OVER

Ezra Sklar, Camden, N. J.

Refiled for abandoned application Serial No. 509,387, January 17, 1931. This application December 28, 1938, Serial No. 248,094

10 Claims. (Cl. 88—17)

This application is a refile of application Serial No. 509,387 filed on January 17, 1931.

This invention relates to automatic safety control and change-over devices for motion picture machines and has for its object the provision of a new and improved device of this class.

Excluding direct ignition as a cause, fire in motion picture films while in the projector may result from any of the following causes:

1. Breakage of film while in aperture of projector. The incoming end of the film is left in the path of the light and the heat of the lamp causes it to ignite.

2. Failure of the intermittent sprocket to pull the film away from the aperture with sufficient speed. This can be caused by a total stoppage of the intermittent sprocket or a slowing down of the sprocket. In either case it results in the exposure of a particular segment of the film to the heat of the lamp for a period sufficient to ignite the same.

3. Failure of the machine as a unit to move the film or move it with sufficient speed. This will also result in the exposure of a particular segment of the film to the heat of the lamp for a time sufficient to ignite the same.

4. Failure of the lower take up. This results in the film bulging or buckling upward and getting into the path of the light from the lamp. This also results in a particular segment of the film being exposed to the heat of the lamp for a time sufficient to ignite the same.

This invention has as its object the provision of means for shielding the film from the light of the lamp immediately upon the occurrences of any one of the above mentioned conditions which result in the ignition of the film.

Another object of this invention is to provide a battery of motion picture machines having my fire preventing attachments with automatic change-over means whereby change can be made from one machine to the other, as is required by the present practice in the art of projection, with safety and absolute freedom from danger of ignition of the film for any of the causes hereinabove listed.

Another object of this invention is to prevent the occurrence of a white screen.

These as well as other objects of this invention and the advantages arising therefrom will become more apparent from the following description and the drawings which form a part hereof.

Referring more particularly to the drawings wherein similar reference numerals denote similar parts, reference numeral 1 denotes the aperture plate of a motion picture machine. (In the illustration herein disclosed, my invention is shown as attached to a Simplex motion picture machine. It is to be understood, of course, that my invention may be used with any other type of motion picture machine, making the slight changes necessary to adapt it for attachment to and use with the said different types of motion picture machines.) Reference numeral 2 denotes a motion picture film running over the intermittent sprocket 4 and the take-up sprocket 5 and in front of the aperture 6 formed in the aperture plate 1. The aperture plate 1 has a cooling plate 7 attached thereto. The film 2 has the usual lower loop 3 formed therein. These features are all old in the art and in and of themselves do not constitute a part of my invention and for that reason will not here be further described.

Attached to the face of the cooling plate 7 is my automatic aperture closing device 8. The automatic aperture closing device 8 is composed of a T shaped bearing member 9 composed of the elements 19, 20 and 21. The element 19 has the apertures 10 formed therein whereby the aperture closing device may be attached to the cooling plate 7 by means of screws or their equivalents. Attached to the member 19 by means of screws 12 are the pivot plates 11. Pivoted in the pivot plates 11 is the shutter 13 having the shank arms 15 and 16 which serve as shafts for the shutter 13. The shank arm 15 terminates in the handle member 17 and the shank arm 16 terminates in the lug 18.

Pivotally mounted at 23 in the member 21 is the lower loop film actuated lever 22. The lower part of the lever 22 is bent at 25 to form the member 27. The member 27 carries the contact plate 28 which has a guide groove 29 formed therein in which is received the edge of the lower loop film element 3. The upper member 26 of the lever 22 has a lug 31 formed thereon. Attached to the member 26 is a spring 30 which normally pulls the lug 31 against the end 34 of the lever 32 which is pivoted at 33. The lever 32 has formed thereon a lug 86 on which the lug 18 is adapted to rest when the shutter 13 is in the open position. Attached to the lever 32 is a spring 44 which normally tends to pull the lever 32 towards the lug 18 and hold the lug 86 in its operative position. The lever 32 terminates in an arm 35 which contacts with a lug 38 formed on the lever 36 pivoted at 37. The lever 36 has an arm 39 formed thereon. Carried by the arm 39 is the film contacting plate 40. The plate 40 has a film contacting groove 41 formed therein which contacts with the portion 42 of the film. The respective strength of the springs 30, 43 and 44 is such that the pull of either spring 30 or 43 is stronger than the pull of spring 44.

Figure 5:
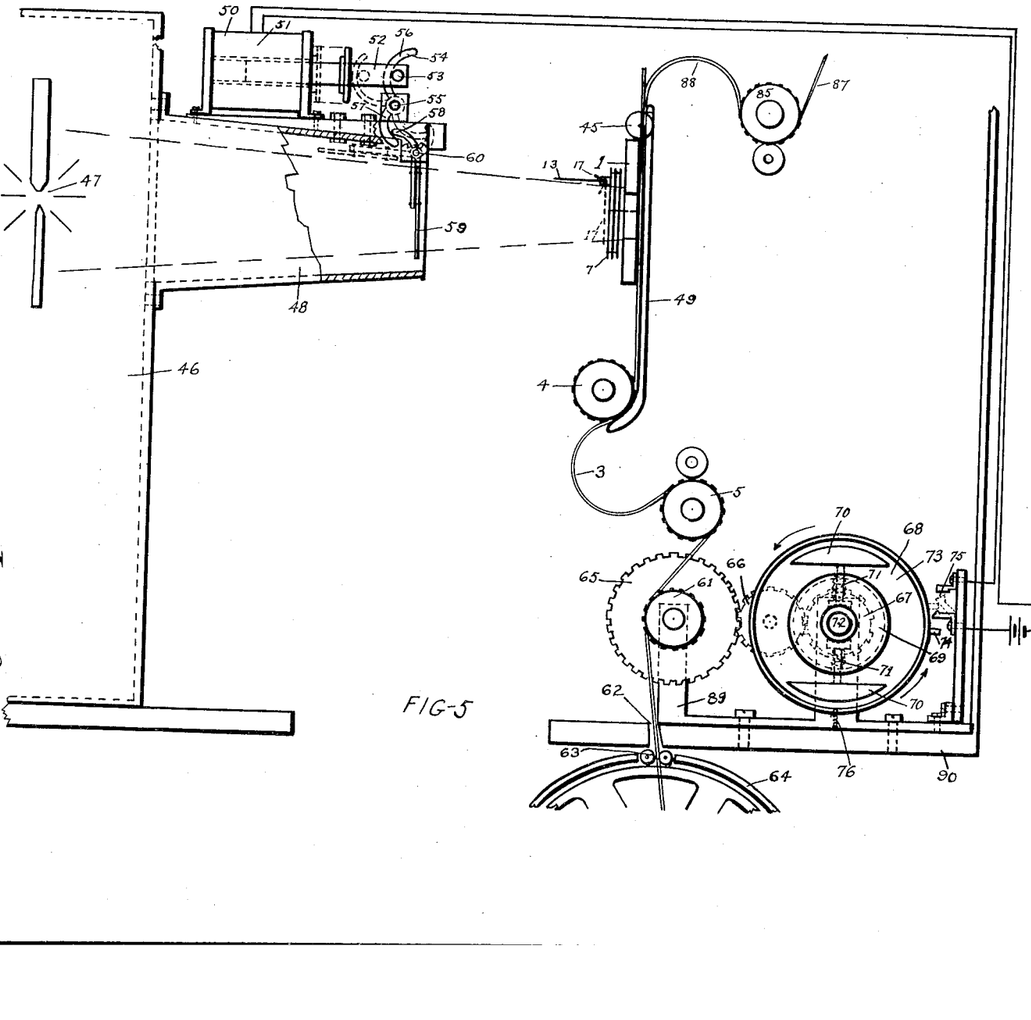
Figure 5 is a side view showing my douser and governor control therefor positioned in the machine.
Figure 6:
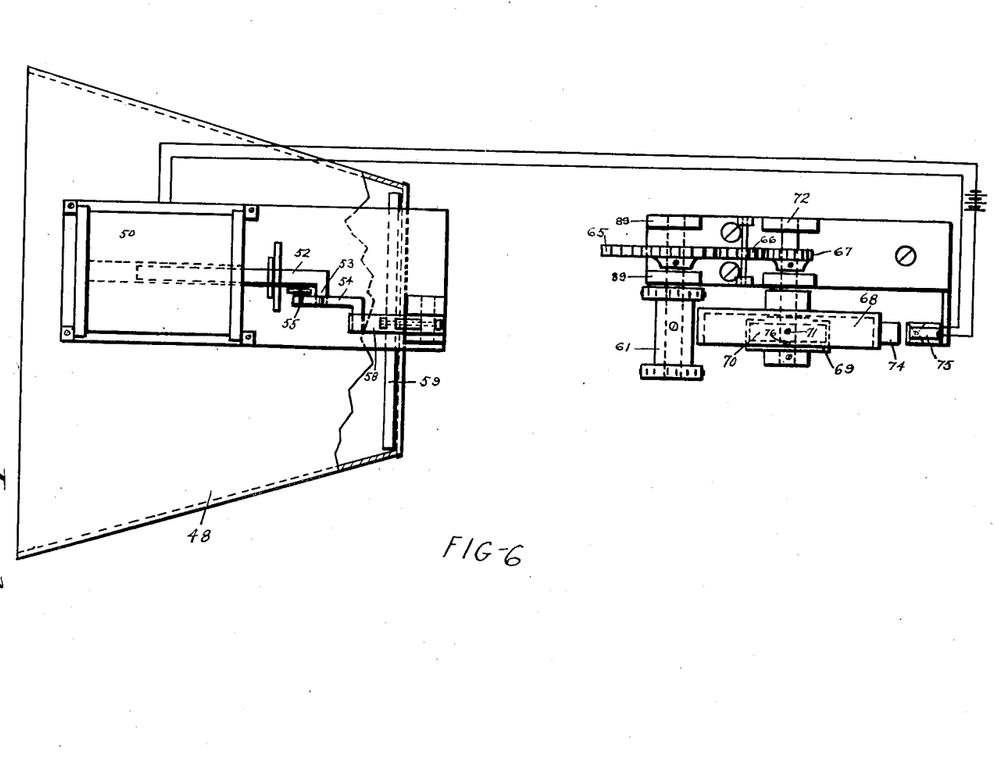
Figure 6 is a top view of the disclosure of Figure 5.

Referring more particularly to Figures 5 and 6, reference numeral 46 denotes a lamp house as a unit having a lamp or light source 47 and the usual cone 48 through which light is projected through the aperture 6 in the plate 1 upon the film which runs between the aperture plate 1 and the pressure plate 49. This particular portion of the mechanism is old in the art and does not, in and of itself, form a part of my invention alone and apart from the combination as shown and for that reason will not be here further described.

Mounted upon the cone 48 is a magnet 50, composed of a solenoid 51 and a plunger 52. The magnet is of the well known construction, with such changes in base as may be necessary to properly mount the same in position, as shown in Figure 5. Since magnets of this type per se are old in the art and the magnet in and of itself does not constitute a part of this invention, the same will not be here further described.

The plunger 52 of the magnet 50 has a guide pin 53 attached thereto which contacts with the arm 56 of a lever 54 pivoted at 55. The lever 54 has an arm 57 formed thereon which contacts with the arm 58 which is attached to the douser 59. The arm 58 is pivoted at the point 60.

Mounted in the body of the motion picture projecting machine is a governor 68 which is composed of a revolving member 69 fixedly mounted upon a shaft 72. The revolving member 69 carries the movable shoes 70 which are normally actuated inwardly by the springs 71. Loosely mounted on the shaft 72 is a casing 73 which carries an arm 74 adapted to contact with and throw the switch 75. The arm 74 of the casing 73 is normally kept out of contact with the switch 75 by the spring 76.

That portion of the governor mechanism 68, composed of the elements 69, 70, 71, 72, and 73, in and of itself is old in the art, does not constitute a part of my invention alone and apart from the combination as shown, and for that reason will not be here further described. The governor mechanism 68 is driven directly by the film which contacts with a sprocket 61 mounted on the member 89 carried by the base 90 of the motion picture projecting machine. Attached to the sprocket 61 is a gear 65 which drives the governor 68 through the idler gear 66 and the gear 67 fixedly attached to the shaft 72.

Figure 7:
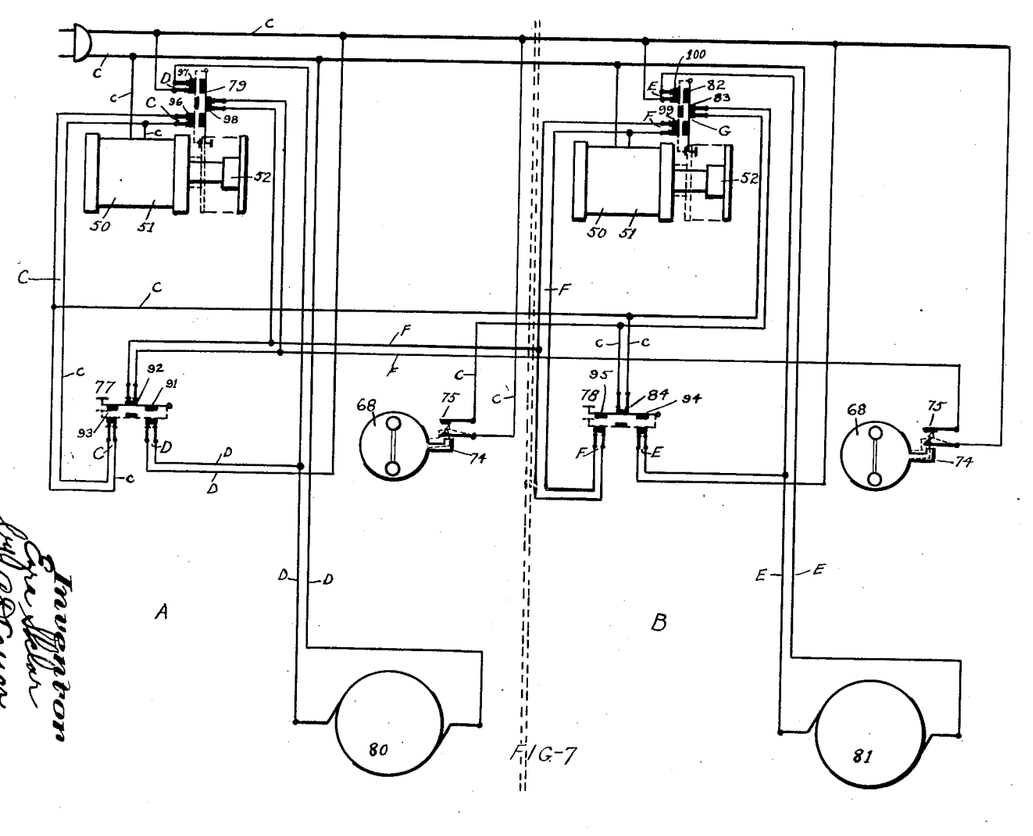
Figure 7 is a schematic electric wiring diagram showing the wiring arrangement for the automatic change-over feature of my device.

Figure 7 shows schematically a battery of two machines equipped with my combined automatic safety controls and automatic change-over. The wiring and circuits necessary to produce this combination is schematically shown. This combination constitutes one of the essential features of my invention.

Although the operation of the above device is believed to be obvious from the above disclosure, nevertheless for the purpose of obviating any possible misunderstanding, the following detailed description is here given.

Let it be assumed that we start with both machines in the inoperative position. The operator threads the projector "A" in the usual manner.

In this position, the proper edge of the lower loop film element 3 contacts with the groove 29 of the contact plate 28 and the proper edge of the upper portion 42 of the film contacts with the groove 41 formed in the plate 40. The pressure of the loop portion 3 causes the arm 22 to be forced outwardly against the pressure of the spring 30. The tension of the film portion 42 against the plate 40 causes the arm 36 to be pushed outwardly against the tension of the spring 43. This relieves the arms 32 and 35 from all pressure except that of the spring 44 which pulls the arm 32 inwardly, causing the end of the lug 86 to press against the lug 18 carried by the shank 16 of the shutter 13. The shutter 13 is raised by means of the arm 17 with the result that the spring 44 pulls the arm 32 over to the position where the lug 86 is in a position to support the lug 18 and thus hold the shutter 13 in its raised position.

Figure 1:
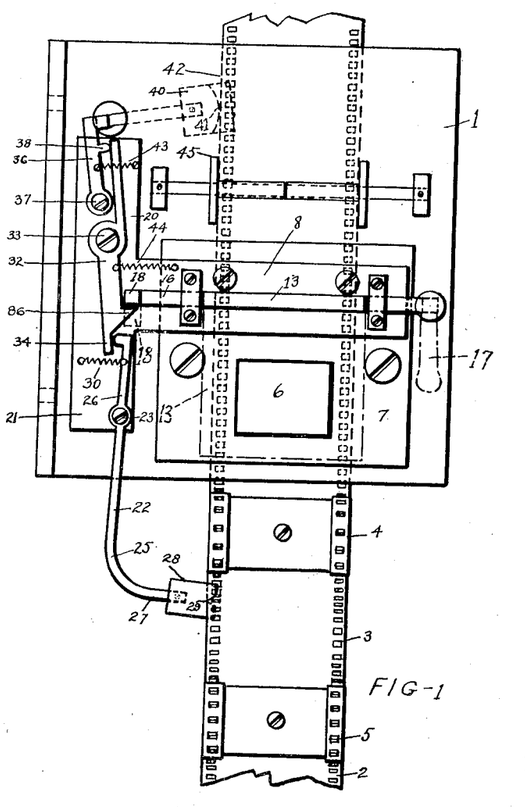
Figure 1 is a front view showing my aperture closing device attached to the front plate of the motion picture machine.
Figure 2:
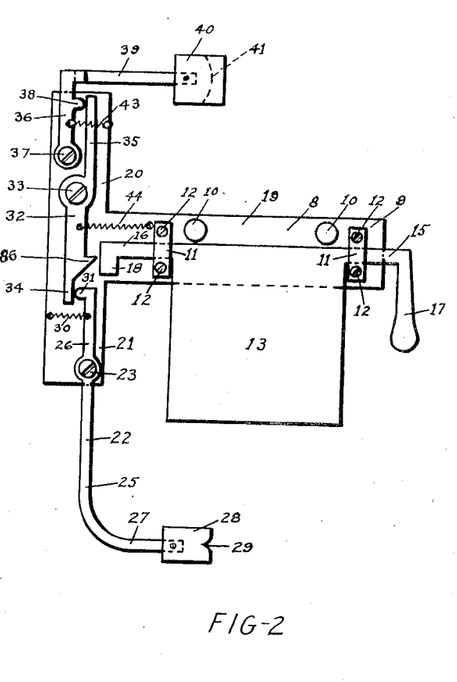
Figure 2 is a front view showing my aperture closing device detached from the machine.

In the event of a break in the film in the vicinity of the aperture 6 but above the sprocket 4, the operation of the motion picture machine will result in the pulling away of the lower portion of the film. This results in a breaking of contact between the film loop 3 and the plate 28 carried by the arm 22 since there is no film present at the point and relieves the pressure which had been exerted by the spring 30 with the result that the spring 30 pulls the arm 26 outwardly, causing the arm 22 to rotate inwardly. In the outward motion of the arm 26 the lug 31 pushes against the end 34 with the result that the lever 32 is pushed outwardly around its pivot 33. The pull of the spring 30 is stronger and thus overcomes the pull of the spring 44. Outward motion of the lever 32 results in the breaking of contact between the lug 86 and the lug 18. The removal of the support of the lug 18 results in the fall of the shutter 13 into its lowered position (shown by the dot and dash lines in Figure 1 and by the full lines in Figure 2). The shutter 13 in its lowered position covers the aperture 6 and prevents any light from the lamp from striking the end of the film which has been left in the aperture.

Breaking of the film at the point 87 on the far side of the roller 45 (see Figure 3) results in the breaking of the contact between the film 42 and the plate 40. This removes the pressure against the spring 43. The spring 43 now exerts a pull on the lever 36 which results in the said lever 36 being urged inwardly. In the inward motion of the said lever, the lug 38 contacts with the arm 35 and pushes the same inwardly around its pivot 33 against the pull of the spring 44. This action results in the inward motion of the arm 35 around the pivot 33 and in the outward motion of the lever 32. The outward motion of the lever 32 results in the breaking of the contact between the lugs 86 and 18 and in a dropping of the shutter 13.

Figures 3, 4:
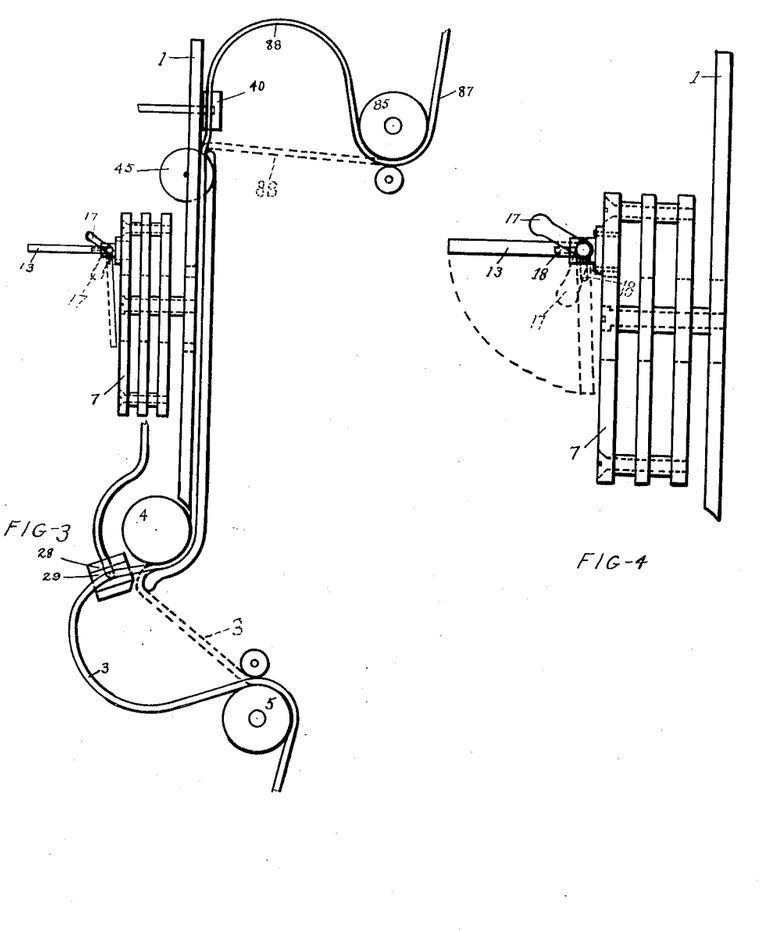
Figure 3 is an enlarged side view of the disclosure in Figure 1.
Figure 4 is an enlarged side view of the shutter of my aperture closing device shown in Figure 1. The raised position of the device being shown in full lines and the lowered position being shown in dotted lines.

A failure of the sprocket 85 to feed the loop 88 results in the upper loop 88 assuming the position shown in Figure 3. This results in a breaking of the contact between the plate 40 and the film 42 and in the dropping of the shutter 13.

A break in the film at any point between the sprocket 85 and the roller 45 will result in a breaking of the contact between the plate 40 and the film when the dropping of the shutter 13, as hereinabove outlined, occurs.

In the event that the sprocket holes in the film which contact with the sprocket 4 are ripped the sprocket 4 will not feed the film towards the sprocket 5, the loop 3 will therefore be eliminated, the film assuming the position shown by the dotted lines in Figure 3. This results in the breaking of the contact between the plate 28 and the film 3 with the resultant dropping of the shutter 13 through the functioning of the mechanism as hereinabove outlined.

To start the projector A after it has been threaded, it is only necessary to light the lamp 47 in the usual manner and then depress the three circuit contact switch 77 to the position shown by the dotted lines in Figure 7. This breaks the contact at 92 and makes contact at 91 and 93. Contact at 91 results in the closing of the circuit D which controls the motor 80 of the projector A. This results in the actuation of the projector mechanism. As the motor develops speed it communicates the same to the projector mechanism which in turn communicates it through the film, the sprocket 61, the gears 65, 66, and 67 to the governor 68. A point is quickly reached wherein the speed of the governor 68 is such that centrifugal force causes the shoes 70 to fly outwardly against the force of the springs 71. The shoes 70 when extended sufficiently contact with the inner surface of the member 73 loosely mounted on the shaft 72. The shoes 70 frictionally engage the member 73 and carry it in the direction of rotation of the governor 68 shown by the arrows in Figure 5. This causes the arm 74 to contact with and throw the self return switch 75 to the position shown by the dotted lines in Figure 5 and 7. Since the key 77 is in the position wherein contact is made at 93, throwing of the self return switch 75 results in the closing of the electromagnet circuit C of the projector A. The closing of the circuit C results in the energization of the electromagnet 50. The energized magnet now pulls the plunger 52 inwardly causing the plunger to perform the following two functions:

(a) The key 79 is depressed to the position shown by the dotted lines in Figure 7, thus breaking the contact at 98 and making contact at 96 and at 97. This results in the maintenance of the closed circuit C and in the further maintenance of the motor circuit D. The key 77 may now be released and the circuits C and D will remain closed through the contacts at 96 and 97.

(b) As the plunger moves inwardly the contact guide 53 contacts with the arm 56 of the lever 54 and causes the lever 54 to rotate around its pivot 55 and assume the position shown by the dotted lines in Figure 5. Rotation of the lever 55 causes the arm 57 to contact with the lever 58 forcing the lever to rotate around its pivot 60 and assume the position shown by the dotted lines in Figure 5. Rotation of the lever 58 raises the douser 59 and permits the light from the lamp to fall upon the film aperture plate 1. If all has gone well with the film, the shutter 13 carried by the plate 1 will be in the raised position and the subject matter on the film will be projected on the screen. If, however, a break had occurred in the film, the shutter 13 will be in the lowered position thus preventing the occurrence of a white screen and also the ignition of the film.

A break of the film at any time at a point between the sprocket 85 and the take-up sprocket 5 will result in the consecutive functioning of the shutter 13 and of the douser 59. The first result of a break in the film at a point between the sprocket 85 and the sprocket 5 will be the dropping of the shutter 13 through the functioning of the shutter control elements as hereinabove fully set forth. The take-up reel 64 continues to function in spite of the break in the film and a time is soon reached when the free end of the broken film passes the sprocket 61, thus breaking contact between the sprocket 61 and the film. Since the film, which is the direct driving driving element of the gear 61, no longer contacts with it, the gear ceases to rotate. This results in the stoppage of the revolution of the governor. The springs 71 of the governor 68 pull the shoes 70 inwardly breaking the frictional contact between the shoes 70 and the member 73. The spring 76 now pulls the member 73 to its neutral position breaking the contact between the arm 74 and the self opening switch 75. The switch 75, having been relieved of the closing pressure exerted by the arm 74, opens breaking the circuit C. This causes the electromagnet 50 to become de-energized. The weight of gravity causes the douser 59 to fall and assume the position shown by the full lines in Figure 5, cutting off the light from the lamp 47. In its downward movement, the douser 59 causes the lever 58 to rotate inwardly and assume the position shown by the full lines in Figure 5. The lever 58 in its inward movement contacts with the arm 57 of the lever 54 causing the lever 54 to rotate around its pivot 55 and assume the position shown by the full lines in Figure 5. The rotation of the lever 54 causes the arm 56 of the lever 54 to contact with the guide and contact member 53 of the plunger 52 pulling the plunger outwardly and causing it to assume the position shown by the full lines in Figure 5. This relieves the pressure on the key 79 causing it to assume the position shown by the full lines in Figure 7. This breaks the contacts at 96 and at 97 thus making it impossible for the projector to start again until the key 77 is again pressed by the operator.

Of course, the operator would not press the key until the break in the film or whatever was the source of trouble is fixed. If he did press the key 77 before the break is repaired, the douser would not be lifted, since the governor 68 would not be driven by the film since there would not be any film in contact with the gear 61 and therefore the governor 68 would not function to close the necessary circuits.

A break in the film at any point between the sprocket 5 and the sprocket 61 will result in a break of the contact between the sprocket 61 and the film which in turn results in a stopping of the governor 68, the demagnetization of the electromagnet 50, the drop of the douser 59, the breaking of the motor circuit D and the stopping of the motor.

A break in the film between the sprocket 61 and the take-up reel 64 will result in a material slowing down, if not in the full stoppage, of the film driven sprocket 61, either of which will result in a slowing down of the governor 68 to a point wherein its component elements will operate to relieve the pressure on the self opening switch 75 which will result in the demagnetization of the electromagnet 50, the dropping of the douser 59, and the stopping of the motor 80 as hereinabove described.

Let it now be assumed that the key 77 has been depressed, that everything has gone well, that the projector A is functioning and that the end of the reel is being reached. Let it be assumed further that the operator, acting in accordance with the usual practice, has threaded projector B, that the lamp has been lit, and that the projector is ready for operation. We are now ready for the change-over.

To make the change-over, the operator waits until the proper cue is reached and then presses the key 78. This breaks the contact at 84 and makes the contacts at 94 and 95. Making of the contact at 94 closes the circuit E and throws the motor 81 of the projector B into operation. As the motor picks up speed, this speed is imparted to the film operating parts of the projector which, of course, in turn operate the film at a higher speed. The film operates the sprocket 61 on the projector B which in turn causes the operation of the governor 68 on the projector B. When the motor reaches a certain speed, the speed imparted by it to the film controlled governor becomes such that it results in the gripping of the member 73 by the shoes 70 and in the closing of the self opening switch 75 by the arm 74 in the manner hereinabove more specifically set forth. Closing of the switch 75 results in the closing of the circuit F and the energization of the magnet 50 of the projector B. This results in the inward movement of the plunger 52 of the projector B. Inward movement of the plunger 52 results in the raising of the douser 59 of the projector B and in the assumption by the key 82 of the position shown by the dotted lines in Figure 7.

The assumption by the key 82 of the position shown by the dotted lines in Figure 7 results in the breaking of the contact at 83 and in the making of contact at 99 and at 100. This results in the falling of the douser plate 59 of projector A and in the making of certain circuits in projector B, all as hereinafter more specifically set forth. The falling of the douser plate 59 results in the stopping of the motor 80 of projector A, as hereinafter more specifically set forth.

*Stopping of the motor 80*

Breaking of the contact at 83 results in the opening of circuit C. Opening of circuit C results in the demagnetization of the electromagnet 50 of the projector A. This results in the falling of the douser 59 of the projector A and in the assumption by the plunger 52 of the projector A of the position shown by the full lines in Figure 5. The assumption by the plunger 52 of the projector A of the position shown by the full lines in Figure 5 results in the removal of pressure on the key 79 and in the return of the said key to the position shown by the full lines in Figure 7. This results in the breaking of the contact at 97. Breaking of the contact at 97 breaks the motor circuit D and causes the motor 80 of the projector A to stop, thus stopping the projector.

*Making of parallel circuits in projector B*

Making of the contact at 99 results in the closing of the circuit F through the contact 99 as well as through the contact 95. Making of the contact at 100 results in the closing of the circuit E through the contact at 100 as well as the contact at 94. The change-over is now complete and the operator may now remove his finger from the key 78, permitting it to assume the position shown by the full lines in Figure 7. This breaks the contact at 95 and 94 and makes the contact at 84. Breaking of the contact at 94 and 95 has no effect on projector B since both the motor circuit E and the electromagnet circuit F remained closed through the contacts 100 and 99 respectively.

It is to be understood that the reels of films are provided with the number of dead sections, or sections without any photography, necessary to permit the film to run the period of time necessary to operate the control elements hereinabove set forth. It is to be further understood that the reels of films are provided with the proper cues upon which the operator presses the proper change-over button.

From the above description, it is seen that if the speed of the motor or the film in the projector falls below a certain point, the governor 68 will function so as to cause the douser 59 to drop, thus cutting off the light of the lamp 47 from the film and thus preventing fire which would otherwise occur as a result of a certain section of the film being exposed to the light for too long a period of time.

The above disclosure is to be understood as being by the way of illustration and not by the way of limitation since many changes may be made in my device without departing from the spirit of my invention. For this reason, it is my desire that the claims which are hereunto appended for the purpose of defining my invention be limited only by the prior art.

*Definition.*—The term "motion picture machine", as used in the specification and claims, is used to denote the machine unit consisting of the lamp, the lamp house, the upper and lower magazines and the head including all of the actuating mechanism.

Having described my invention, what I claim as new and useful is:

1. In combination with a motion picture machine having a light source and a film aperture plate having a film aperture formed therein and positioned for receiving a beam of light emanating from said light source, a film controlled shutter carried by said aperture plate for closing said aperture, and a film controlled douser positioned between said light source and said aperture for cutting off from said film aperture said beam of light, said film controlled shutter consisting of a bearing member carried by said aperture plate, a shutter pivotally mounted in said bearing member, an upper film contacting arm pivotally mounted in said bearing member, a lower film loop contacting arm pivotally mounted in said bearing member, a lever pivotally mounted in said bearing member and positioned for operative contact with each of said film contacting arms, said lever having a shutter supporting lug formed thereon, and means operatively connected to each of said contacting arms for normally causing each of said contacting arms to urge said lever in a direction removing said lug from said shutter; said douser consisting of an electromagnet, a plate positioned for being raised by said electromagnet when said electromagnet is energized and for falling to a position wherein it will cut off the said light beam from said aperture when said electromagnet is de-energized and a normally open circuit including a current source for supplying electrical energy to said electromagnet, means for closing said circuit and a film controlled governor for operating said circuit closing means.

2. In the combination of a motion picture machine having a light source and a film aperture plate having a film aperture formed therein and positioned for receiving a beam of light emanating from said light source, a film controlled shutter carried by said aperture plate for closing said aperture, and a film controlled douser positioned between said light source and said aperture for cutting off said beam of light from said aperture; said film controlled shutter consisting of a bearing member carried by said plate, a shutter pivotally mounted in said plate, an upper film contacting arm pivotally mounted in said plate, a lower film loop contacting arm pivotally mounted in said plate, a lever pivotally mounted in said plate in position for operative contact with said film contacting arms, said lever having a shutter supporting lug formed therein, resilient means attached to said lever and positioned so as to normally urge said shutter supporting lug to its shutter supporting position, and resilient means attached to each of said film contacting arms and positioned so as to normally cause said film contacting arms to urge said lever to the position wherein said shutter supporting lug is out of contact with said shutter, the force exerted by each of said film contacting arm resilient actuating means being stronger than said lever resilient actuating means, said film controlled douser consisting of an electromagnet, a plate positioned for being raised by said electromagnet when said electromagnet is energized and for falling to a position wherein it will cut off said light beam from said aperture when said electromagnet is de-energized and a normally open circuit including a current source for supplying electrical energy to said electromagnet, means for closing said circuit, and a film controlled governor for operating said circuit closing means.

3. In combination with a motion picture machine having a light source and a film aperture plate having an aperture formed therein and positioned for permitting the passage of a beam of light emanating from said light source a film controlled means for closing said aperture, said means consisting of a bearing member, a shutter movably mounted in said bearing member, shutter supporting means movably mounted in said bearing member, an upper film contacting arm and a lower film loop contacting arm each positioned for actuating said shutter supporting means, and means attached to each of said arms for normally causing each of said arms to contact with said shutter supporting means and urge said shutter supporting means to assume a position wherein said shutter supporting means does not support said shutter.

4. In combination with a motion picture machine having a light source and a film aperture plate having an aperture formed therein and positioned for permitting the passage of a beam of light emanating from said light source film controlled means for closing said aperture, said means consisting of a bearing member carried by said plate, a shutter covering said aperture pivotally mounted on said bearing member, a lever pivotally mounted on said bearing member, said lever having a shutter supporting lug formed thereon, means attached to said lever for urging said lever to assume the position where said lug supports said shutter, an upper film contacting arm pivotally mounted in said bearing member and positioned for operative contact with said lever, a lower film loop contacting arm mounted in said bearing member and positioned for operative contact with said lever, and means attached to each of said arms for normally causing each of said arms to contact with said lever and urge said lever to assume the position wherein said lug does not support said shutter.

5. In combination with a motion picture machine having a light source, a film aperture plate having a film aperture formed therein and positioned for receiving a beam of light emanating from said light source and a film mounted for movement past said aperture, said film having an upper portion and a lower loop, film controlled means for covering the said aperture said means consisting of a bearing member, a shutter pivotally mounted on said bearing member and positioned for covering said aperture in its lowered position, a lever pivotally carried by the said bearing member, said lever having a shutter supporting lug formed thereon, a spring attached to said lever and positioned for actuating said lever to the position wherein said lug supports said shutter, an upper film portion contacting arm pivotally mounted in said bearing member, and a lower film loop contacting arm mounted in said bearing member, each of said film contacting arms being positioned for operative contact with said lever, and each of said arms having attached thereto a spring, each of said springs being positioned for actuating its respective arm in a direction so as to contact with and urge said lever to assume the position wherein said lug does not support said shutter, the force exerted by each of said arm actuating springs being stronger than the said lever actuating spring.

6. In combination with a motion picture machine having a light source, a film aperture plate having a film aperture formed therein said film aperture being positioned for receiving a beam of light emanating from said light source and a film mounted for movement past said aperture film controlled means positioned between said light source and said aperture for shutting off from said aperture a beam of light emanating from said light course, said means consisting of an electromagnet, a normally open circuit including a source of current for energizing said electromagnet when said circuit is closed, a self-opening switch for closing said circuit, a governor carried by said machine, an arm carried by said governor said arm being positioned so as to contact with and close said self-opening switch when said governor is in its active phase, a train of gears the teeth of the first of which are positioned for contact with and actuation by the sprocket hole edges of said film and the last of which is positioned for contact with and actuating said governor, and a douser plate actuated by said electromagnet, said douser plate being positioned so as to cut off said beam of light when in its lowered position and not to interfere with said beam of light when in its raised position.

7. In combination with a motion picture machine having a light source, a film aperture plate having a film aperture formed therein, said film aperture being positioned for receiving a beam of light emanating from said light source and a film mounted for movement past said aperture film controlled means positioned between said light source and said aperture for shutting off from said aperture a beam of light emanating from said light source, said means consisting of an electromagnet, a plunger positioned for being actuated by said electromagnet when said electromagnet is energized, a pivotally mounted lever positioned for being actuated by said plunger, a pivotally mounted arm positioned for being actuated by said lever, a douser plate carried by said arm and positioned so as not to obstruct said beam of light when in its raised position and so as to cut off said beam of light when in its lowered position, a normally open electric circuit including a source of power for energizing said electromagnet when said circuit is closed, a self opening switch for closing said circuit, a governor consisting of a rotary member, shoes movably carried by said rotary member, springs attached to said shoes and positioned so as to oppose the outward motion of said shoes, an annular member loosely mounted on said rotary member and positioned for frictional gripping engagement with and actuation by said shoes when said governor is in its active phase, an arm carried by said annular member and positioned for operative contact with and the closing of said switch when said governor is in its active phase, and a spring attached to said annular member and positioned so as to oppose any motion of said annular member, and a train of gears operatively connected to said film at its power input end and for being driven by said film and operatively connected at its power output end to said rotary member of said governor for driving said rotary member.

8. In combination with a pair of motion picture machines arranged as a battery for consecutive use, each of said motion picture machines having as a component part thereof a light source, an aperture plate having an aperture formed therein and positioned for receiving a beam of light emanating from said light source, and a film mounted for movement past said aperture plate, means for automatically causing the operation of one of said machines and the discontinuance of the operation of the other of said machines, said means consisting of a normally open electric circuit arranged to selectively control either of said machines, said electric circuit being connected to a source of power; said electric circuit being divided into two normally open branches—one for each of said machines; each of said branches being sub-divided into a normally open motor sub-circuit for controlling a motor positioned for driving the machine in its branch, a normally open governor controlled electro-magnetic douser sub-circuit for controlling an electro-magnetic douser positioned in said machine for cutting off said beam of light when in its lowered position and so as not to interfere with said beam of light when in its raised position, said governor being driven by said film, said governor controlled sub-circuit having a governor controlled self-opening switch for closing the same, and two parallel sub-circuits one being in parallel with said motor sub-circuit and the other being in parallel with said governor controlled electro-magnetic douser sub-circuit; a manually controlled three circuit switch for controlling each of said branches, each said manually controlled switch being positioned for closing the electro-magnetic douser sub-circuit of the other branch when said manually operated switch is in the raised position and for closing both the motor sub-circuit and the governor controlled electro-magnetic douser sub-circuit of its own branch when said manually operated switch is in the depressed position; said electro-magnetic douser operated switch being positioned for closing the governor controlled electro-magnetic douser sub-circuit of the other branch when said douser operated switch is in the raised position, and for closing both the motor and the electro-magnetic douser sub-circuits in its own branch, when said douser operated switch is in the depressed position.

9. In combination with a motion picture machine having a light source and a film aperture plate having an aperture formed therein and positioned for permitting the passage of a beam of light emanating from said light source a film controlled means for closing said aperture, said means consisting of a bearing member, a shutter movably mounted in said bearing member, shutter supporting means movably mounted in said bearing member, an upper film contacting arm and a lower film loop contacting arm each positioned for actuating said supporting means, means attached to each of said arms for normally causing each of said arms to contact with said shutter supporting means and urge said shutter supporting means to assume a position wherein said shutter supporting means does not support said shutter, means positioned between said aperture and said light source for cutting off said beam of light from said aperture, and a film controlled governor for controlling said means.

10. In combination with a motion picture machine having a light source and a film aperture plate having a film aperture formed therein and positioned for permitting the passage of a beam of light emanating from said light source film controlled means for closing said aperture, said means consisting of a bearing member carried by said plate, a shutter covering said aperture movably mounted on said bearing member, a lever having a shutter supporting lug formed thereon movably mounted on said bearing member, means attached to said lever for urging said lever to assume the position where said lug supports said shutter, an upper film contacting arm movably mounted in said bearing member and positioned for operative contact with said lever, a lower film loop contacting arm mounted in said bearing member and positioned for operative contact with said lever, and means attached to each of said arms for normally causing each of said arms to contact with said lever and urge said lever to assume the position wherein said lug does not support said shutter.

EZRA SKLAR.